(12) United States Patent
Zang et al.

(10) Patent No.: US 11,349,380 B2
(45) Date of Patent: May 31, 2022

(54) LINEAR VIBRATION MOTOR

(71) Applicant: GOERTEK INC., Shandong (CN)

(72) Inventors: Weiye Zang, Shandong (CN);
Dongsheng Mao, Shandong (CN)

(73) Assignee: GOERTEK INC., Shandong (CN)

( * ) Notice: Subject to any disclaimer, the term of this patent is extended or adjusted under 35 U.S.C. 154(b) by 325 days.

(21) Appl. No.: 16/638,353

(22) PCT Filed: Nov. 21, 2017

(86) PCT No.: PCT/CN2017/112168
§ 371 (c)(1),
(2) Date: Feb. 11, 2020

(87) PCT Pub. No.: WO2019/029051
PCT Pub. Date: Feb. 14, 2019

(65) Prior Publication Data
US 2020/0169156 A1 May 28, 2020

(30) Foreign Application Priority Data

Aug. 11, 2017 (CN) .......................... 201721004492.7

(51) Int. Cl.
*H02K 33/18* (2006.01)
*B06B 1/04* (2006.01)
(52) U.S. Cl.
CPC .............. *H02K 33/18* (2013.01); *B06B 1/045* (2013.01)

(58) Field of Classification Search
CPC ........ H02K 33/00; H02K 33/02–33/04; H02K 33/18; B06B 1/045
See application file for complete search history.

(56) References Cited

U.S. PATENT DOCUMENTS

2018/0287475 A1* 10/2018 Mori ...................... H02K 33/02

* cited by examiner

*Primary Examiner* — Ramon M Barrera
(74) *Attorney, Agent, or Firm* — Paratus Law Group, PLLC

(57) ABSTRACT

A linear vibration motor, comprising a stator assembly and a vibrator assembly. The stator assembly comprises a housing (1) having a receiving cavity, a magnet (2) located in the receiving cavity and jointly fixed to the housing (1), and a central magnetic yoke (3) of which at least one end is jointly fixed to the housing (1). The magnet (2) comprises a hollow portion (21) extending along the vibration direction of the vibrator assembly. The vibrator assembly comprises a coil (4) and a mass block (9). When the vibrator assembly vibrates, the coil (4) vibrates along with the vibrator assembly and is inserted into the hollow portion (21) of the magnet (2). The central magnetic yoke (3) runs through the coil (4). An resilient support member (5) is configured to suspend the vibrator assembly in the receiving cavity of the housing (1). According to the linear vibration motor, the magnetism of the magnet can be utilized to the greatest extent, thereby improving the efficiency of utilizing the magnetic line of force of the magnet by the coil, the central magnetic yoke functions as a guide shaft, thereby ensuring the vibration coaxiality of the vibrator assembly.

16 Claims, 2 Drawing Sheets

LINEAR VIBRATION MOTOR

CROSS REFERENCE TO PRIOR APPLICATION

This application is a National Stage Patent Application of PCT International Patent Application No. PCT/CN2017/112168 (filed on Nov. 21, 2017) under 35 U.S.C. § 371, which claims priority to Chinese Patent Application No. 201721004492.7 (filed on Aug. 11, 2017), which are all hereby incorporated by reference in their entirety.

TECHNICAL FIELD

The invention relates to the technical field of electronic products. More specifically, the invention relates to a linear vibration motor.

BACKGROUND

With the development of communication technologies, portable electronic devices, such as a mobile phone, a tablet computer, an intelligent wearable device, a multimedia entertainment device, and the like, have become essential items for people. In these electronic devices, a micro linear motor is generally used for system feedback, such as a vibration feedback by clicking on a touch screen.

Linear vibration motors generally comprise a vibrator assembly including a mass block, a coil, a central magnetic yoke, a spring plate, and the like, and a stator assembly including a housing, a magnet, and an FPCB, wherein the magnet and the FPCB are fixedly adhered to the housing, the mass block and the coil are fixedly adhered, the spring plate is coupled between the mass block and the housing, the magnet and the coil are arranged coaxially to form a magnetic circuit with the central magnetic yoke, and the coil is disposed within a magnetic field generated by the magnet. In this way, after the coil is energized, the coil is subjected to an ampere force, and the vibrator assembly is driven by the ampere force to perform reciprocating vibration. As a result, the mass block is heavy, and the effect of vibration of the entire linear vibration motor is obtained.

Since a user may frequently drop the portable terminal having the linear vibration motor, an impact generated at the time of dropping may cause the central magnetic yoke to separate from the linear vibration motor, and finally, the impact is transferred to the coil, causing the coil damaged. In addition, although the vibrator assembly should vibrate in a reciprocating manner along the central axis of the vibrator assembly and the stator assembly, the vibration of the vibrator assembly may be deviated due to the assembling error, so that the linear vibration motor is polarized, the reliability of the linear vibration motor is reduced, and the user experience is reduced.

Accordingly, there is a need to provide a novel linear vibration motor to address the disadvantages of the prior art.

SUMMARY

It is an object of the present invention to provide a linear vibration motor capable of preventing separation of the central magnetic yoke from the coil and ensuring coaxial vibration of a vibrator assembly.

According to one aspect of the present invention, there is provided a linear vibration motor comprising:

a stator assembly including a housing having a receiving cavity, a magnet located in the receiving cavity and jointly fixed to the housing, and a central magnetic yoke of which at least at one end being jointly fixed to the housing, the magnet including a hollow portion;

a vibrator assembly including a coil and a mass block, the hollow portion extending along a vibrating direction of the vibrator assembly, the coil vibrating along with the vibrator assembly and inserted into the hollow portion of the magnet when the vibrator assembly vibrates, wherein the central magnetic yoke extends through the coil;

a resilient support member configured to suspend the vibrator assembly in the receiving cavity of the housing.

Preferably, the inner surface of the housing extends inwardly to integrally form a hollow fixing portion, and one end of the central magnetic yoke is inserted into the hollow fixing portion and closely fits with the hollow portion.

Preferably, the other end of the central magnetic yoke is jointly fixed to the housing.

Preferably, the central magnetic yoke includes a cylindrical body portion, and a cylindrical upper end portion formed by extending upwardly from a center of a top surface of the cylindrical body portion, the diameter of the cylindrical upper end portion being smaller than that of the cylindrical body portion, the cylindrical body portion being inserted into the coil, and a lower end of the cylindrical body portion being inserted into the hollow fixing portion, the cylindrical upper end portion being fixedly connected to an upper surface of the housing.

Preferably, the upper surface of the housing is provided with a fixing hole having a diameter larger than that of the cylindrical upper end portion, and the cylindrical upper end portion is inserted into the fixing hole.

Preferably, the inner surface of a top wall of the housing extends inwardly to integrally form an upper hollow fixing portion, the inner diameter of the upper hollow fixing portion is larger than the diameter of the cylindrical upper end portion, and the cylindrical upper end portion is inserted into the upper hollow fixing portion.

Preferably, the mass block is provided with an avoidance hole for passing the central yoke through.

Preferably, the vibrator assembly further comprises a magnetic conductive plate, each of the coil and the mass block is fixedly adhered to an upper surface of the magnetic conductive plate, one end of the resilient support member being fixedly adhered to a lower surface of the magnetic conductive plate, the magnetic conductive plate is provided with an avoidance hole for passing the central magnetic yoke through.

Preferably, the central magnetic yoke is made of a magnetic material.

Advantageous Effects of the Present Invention are as Follows

According to the linear vibration motor provided by the present invention, firstly, by improving the magnet structure and the configuration of the magnet and the coil, the magnetism of the magnet can be maximized, the utilization efficiency of the magnetic force line of the coil magnet can be improved, the electromagnetic driving force of the motor is improved, the effective frequency width of the motor is increased due to the increase of the driving force, the application of the dual-frequency or multi-frequency resonance frequency is facilitated, the requirement of vibration sense provided by the motor at multiple frequency points is met, and the tactile experience of the motor is improved. Secondly, by arranging the central magnetic yoke jointly fixed to the housing in the coil, the number of magnetic force line passing through the coil can be maximized, so that the utilization efficiency of the magnetic force line is improved, the vibrator assembly vibrates along the central magnetic yoke, and the central yoke functions as a guide shaft, thereby ensuring the coaxial 4 of the vibration of the vibrator assembly.

BRIEF DESCRIPTION OF THE DRAWINGS

The invention will now be described in further detail with reference to the accompanying drawings.

DETAILED DESCRIPTION

In the following description, for purposes of illustration, numerous specific details are set forth in order to provide a thorough understanding of one or more embodiments. However, it will be apparent that these embodiments may be practiced without these specific details. In other instances, well-known structures and devices are shown in form of block diagrams to facilitate describing one or more embodiments.

A "mass block" used in the description of the following detailed description may also be referred to as a "counterweight block", each referring to one of the components that vibrates as a vibrator assembly in cooperation with a magnet or a coil within the motor housing. In addition, the present invention is mainly for the improvement of the linear vibration motor used in the description, also referred to as a Y-direction vibration motor. However, in the following description of the embodiments for convenience of description, a linear vibration motor is specifically described as an example.

In order that the present invention may be more clearly described, the invention will be further described with reference to the preferred embodiments and the accompanying drawings. However, it should be noted that, in order to facilitate understanding, descriptions such as "upper surface", "lower surface", "bottom", "top" and the like in the invention are merely explanations provided with reference to the drawings, but not for restrictions. Those ordinary skilled in the art can understand that when the placement position of the motor in the present invention changes, the description and wordings involved in the invention should be based on the actual role it plays in the motor.

The invention provides a linear vibration motor with a novel structure, which improves the magnet structure and configuration of the magnet and the coil, and effectively solves the problems that the current magnet is inefficient in utilization, the motor assembling process is complex, and the existing linear vibration motor is only suitable for vibration experience at a single frequency point and does not meet the requirements of a tactile feedback application for multi-frequency point vibration. On the other hand, the linear vibration motor of the invention may prevent separation of the central magnetic yoke from the coil when the portable terminal drops, prevent the coil from damaging, and ensure coaxial vibration of the vibrator assembly as it vibrates.

Figure 1:
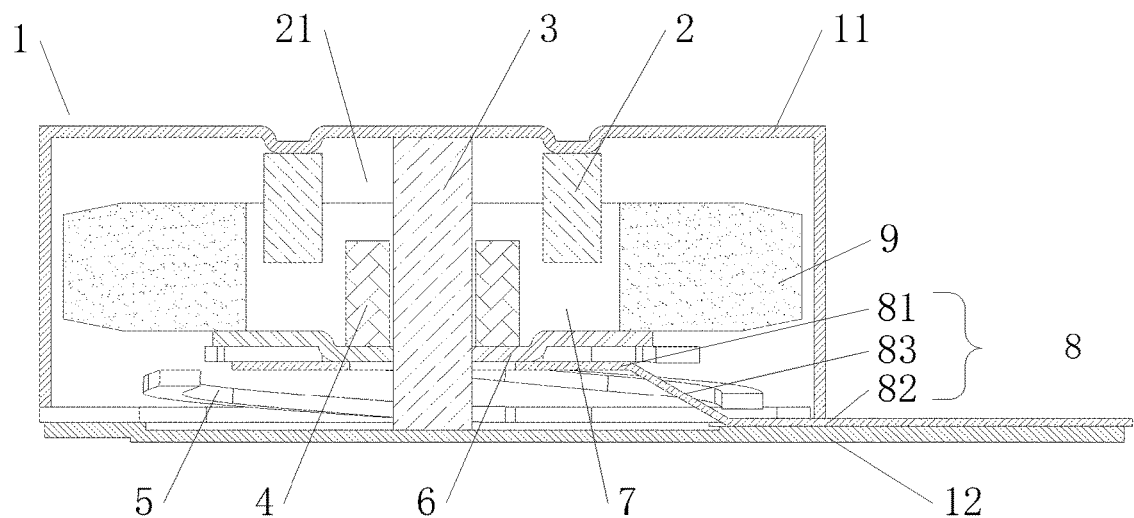
FIG. 1 is a sectional view showing a structure of a linear vibration motor according to a first embodiment of the present invention.

FIG. 1 is a sectional view showing a structure of a linear vibration motor according to a first embodiment of the present invention. The linear vibration motor according to the present embodiment includes a stator assembly, a vibrator assembly and an resilient support member. The stator assembly comprises a housing 1 having a receiving cavity, a magnet 2 located in the receiving cavity and jointly fixed to the housing 1, the magnet 2 including a hollow portion 21 extending in the vibration direction of the vibrator assembly, and a central magnetic yoke 3, of which at least at one end is jointly fixed to the housing 1. The magnet 2 of the present invention may be of a segmented or continuously annular structure, and the present invention is not limited thereto.

The vibrator assembly comprises a coil 4 disposed coaxially with the magnet 2, and a mass block 9 disposed coaxially therewith around the periphery of the coil 4. When the vibrator assembly vibrates, the coil 4 vibrates along with the vibrator assembly and inserts into the hollow portion 21 of the magnet 2 wherein the central magnetic yoke 3 extends through the coil 4 in a coaxial manner.

The resilient support member 5 is configured to suspend the vibrator assembly in the receiving cavity of the housing 1.

Specifically, the housing 1 includes a first housing 11 having an opening at the bottom, and a second housing 12 jointly fixed thereto at the opening. The first housing 11 and the second housing 12 constitute the housing 1 having the receiving cavity. It should be noted that in the present invention, both the first housing 11 and the second housing 12 are made of a material having a magnetic permeability, so that the magnetic force line of the magnets can be closed, and the magnetic magnetism of the magnets 2 can be utilized to the greatest extent to improve the electromagnetic driving force of the motor. As a specific embodiment of the present invention, as shown in FIG. 1, the housing 1 has a circular structure. It is obvious that the housing 1 may have a non-circular cross-sectional structure, for example in a rectangular parallelepiped shape or a rounded rectangular parallelepiped shape. In the present invention, the vibrator assembly further comprises a magnetic conductive plate 6. The coil 4 and the mass block 9 are jointly fixed to the upper surface of the magnetic conductive plate 6 with a gap 7 formed between the coil 4 and the mass 9 for inserting the magnet 2. Corresponding to the magnetic conductive plate 6, the resilient support 5 is jointly fixed between the lower surface of the magnetic conductive plate 6 and the inner surface of the second housing 12, and is configured to suspend the vibrator assembly in the receiving cavity of the housing 1. The central magnetic yoke 3 is made of the magnetic material and forms a magnetic circuit together with the magnet 2. The central yoke 3 of the invention extends through the coil 4 in a coaxial manner. The magnetic conductive plate 6 is provided with an avoidance hole, the diameter of which is slightly larger than that of the central yoke 3, so that the central yoke 3 can pass through the magnetic conductive plate 6 through the avoidance hole. The magnetic conductive plate 6 drives the coil 4 and the mass 9 to vibrate along the outer circumferential surface of the central yoke 3 in an up and down displacement manner, to ensure that the vibrator assembly has good vibration coaxiality. At least one end of the center magnetic yoke 3 is jointly fixed to the housing 1. In this embodiment, one end of the center yoke 3 is jointly fixed to the second housing 12, and the other end is in contact with the inner surface of the top of the first housing 11. With the above-described structure, the assembling difficulties can be reduced and the assembling efficiency of the linear vibration motor can be improved while the connecting reliability between the center yoke 3 and the housing 1 is ensured.

Furthermore, in the present embodiment, the linear vibration motor further comprises a printed circuit board 8 for electrically connecting coil 4 to the external device. The printed circuit board 8 includes a fixing portion 81 jointly fixed to the lower surface of the magnetic conductive plate 6 and electrically connected to the coil 4; a connecting portion 82 located outside the housing 1 and jointly fixed to the upper surface of the second housing 12 for electrically connecting with an external device, and a flexible connecting portion 83 for integrally connecting the fixing portion 81 with the connecting portion 82. The flexible connecting portion 83 is located below the resilient arm of the resilient support member 6. As the vibrator assembly is vibrated, the resilient arm is deformed by compression or tension, and the flexible connecting portion 83 moves up and down accordingly, thereby avoiding a problem that a collision between the flexible connecting portion 83 and the resilient atm of the resilient support member 5 affects the vibration performance of the vibration motor. It will be appreciated by those skilled in the art that a via for a wire connecting the coil and the printed circuit board should be provided in the mass block and/or the magnetically conductive plate of the motor to enable the coil to be electrically connected to the external device, while the specific location and configuration of the via is not limited in the invention.

According to the present invention, the magnet 2, as the stator assembly, has the annular structure and jointly fixed to the inner surface of the top wall of the first housing 11, while the coil 4, as a part of the vibrator assembly, vibrates and inserts into the hollow portion 21 of the magnet 2 as the vibrator assembly vibrates. The configuration of the magnet 2 with the annular structure served as the stator and the coil 4 served as the vibrator enable the magnetic line of force of the annular shaped magnet concentrates to a central axis. Compared with a cylindrical solid core magnet used in a conventional vibration motor, the magnetic force line of the conventional cylindrical solid core magnet is radially distributed outwardly from a central axis, the magnetic field strength at the place where the coil is provided on the central axis of the annular structure magnet in the present invention is higher than that of the place where the coil is sleeved around the cylindrical solid core magnet. Moreover, the coil in the present invention is arranged in the inner space of the ring-shaped magnet, and the diameter of the coil may be small, so that the number of effective turns of the coil is significantly higher than the number of effective turns of the large-diameter coil arranged around the periphery of the cylindrical solid core magnet. Therefore, the linear vibration motor provided by the present invention may utilize the magnetism of the magnet to the greatest extent, improve the utilization efficiency of the magnetic force line of the coil magnet, improve the electromagnetic driving force of the motor and thus increase the effective frequency width of the motor due to the increase of the driving force, facilitate the application of the dual-frequency or multi-frequency resonance frequency, meet the requirement of vibration sense provided by the motor at multiple frequency points, improve the tactile experience of the motor, and improve the overall performance of the linear vibration motor. Since the magnetically conductive plate 6 of the linear vibration motor in the present invention is located below the magnet 2, the stator assembly including the magnet 2 has a relatively large attractive force to the vibrator assembly and may provide vibration resistance to the vibrator assembly after the motor is powered off, which means to provide a brake to the vibrator assembly, so as to stop the motor quickly, that is, the motor vibration descending time is shortened. Further, since the coil 4 includes the central magnetic yoke 3 inside, the utilization of the magnetic force line of the magnet 2 is increased, and the electromagnetic driving force of the motor is increased, thereby accelerating the starting process of the motor, that is, the motor vibration rising time is shortened. According to the linear vibration motor provided in the present invention, while the motor is in a vibration balance position, the vibrator assembly and the stator assembly are attractive to each other, which reduces the small vibration in a state where the motor has no current or a low current, and facilitate the motor quickly return to a static state. According to the linear vibration motor structure provided in the present invention, the vibration rise time of the motor can be shortened because of the high electromagnetic driving force; Since is large, the motor vibration descent time can be shortened because of the high static magnetic force of the motor in the balanced position, which improves the motor response speed as a whole.

Figure 2:
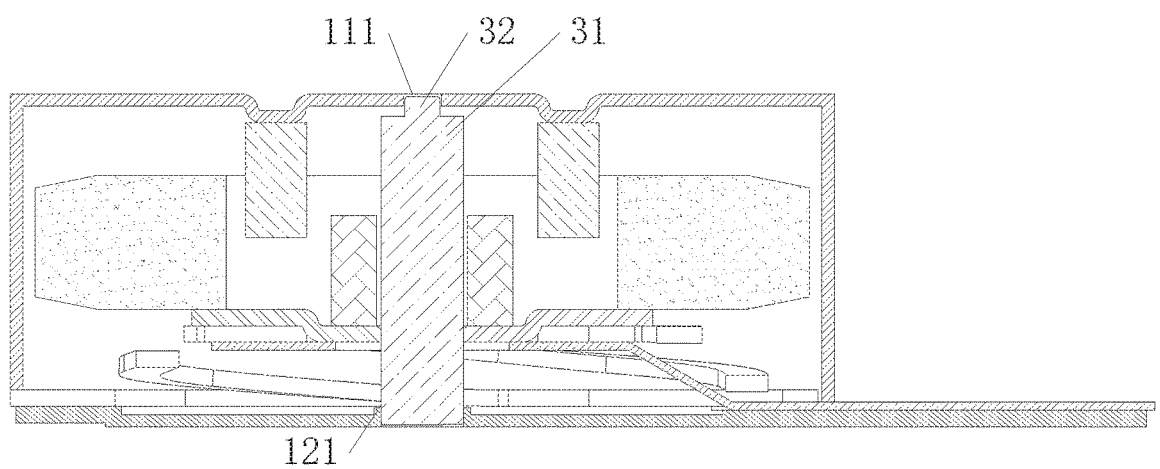
FIG. 2 is a sectional view showing a structure of a linear vibration motor according to a second embodiment of the present invention.

FIG. 2 is a sectional view showing a structure of a linear vibration motor according to a second embodiment of the present invention. This embodiment differs from the first embodiment in the shape of the central magnetic yoke 3 and the manner how the central yoke 3 is fixed to the housing 1. The central magnetic yoke 3 in this embodiment comprises a cylindrical body portion 31 and a cylindrical upper end portion 32 formed by extending upwardly from the center of the top surface of the cylindrical body portion 31, the diameter of the cylindrical upper end portion 32 is smaller than that of the cylindrical body portion 31. The inner surface of the second housing 12 extends upwardly to form a hollow fixing portion 121, and the cylindrical body portion 31 is inserted into the hollow fixing portion 121 and is closely fitted with the hollow fixing portion 121. The first housing 11 is provided with a fixing hole 111 having a diameter slightly larger than that of the cylindrical upper end portion 32, and the cylindrical upper end portion 32 is inserted into the fixing hole 111. The fixing hole 111 may be a through hole or may be a blind hole. Both ends of the center magnetic yoke 3 of the present embodiment are jointly fixed to the housing 1, thereby improving the connection reliability of the central magnetic yoke 3 with the housing 1.

Figure 3:
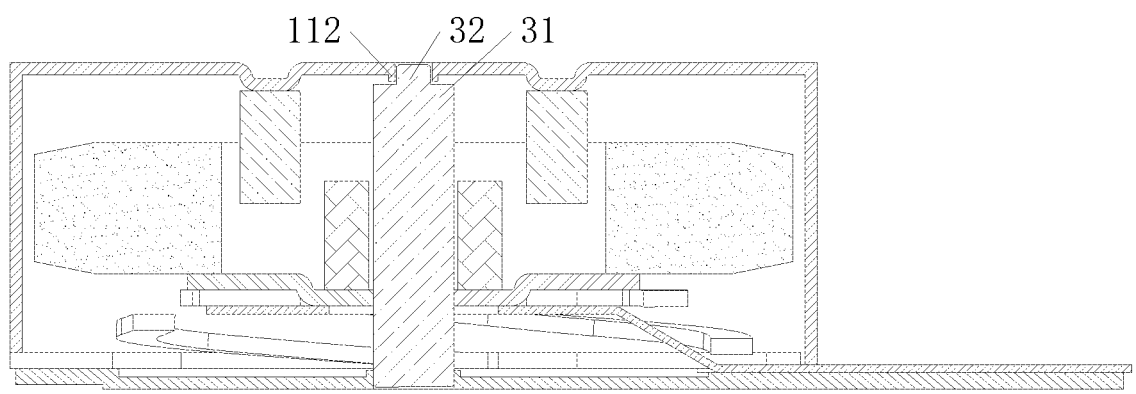
FIG. 3 is a sectional view showing a structure of a linear vibration motor according to a third embodiment of the present invention.

FIG. 3 is a sectional view showing a structure of a linear vibration motor according to a third embodiment of the present invention. The present embodiment differs from the second embodiment in that the inner surface of the top of the first housing 11 extends downward to form an upper hollow fixing portion 112, and the cylindrical upper end portion 32 is inserted into the upper hollow fixing portion 112. Since the upper hollow fixing portion 112 increases the jointing area with the cylindrical upper end portion 32, the connection reliability of the center central yoke 3 with the housing 1 is further improved.

Obviously, the above-described embodiments of the present invention are merely illustrative of the present invention, and are not intended to limit the embodiments of the present invention. Those skilled in the art, based on the above description, will be able to make other variations or variations, which are not intended to be exhaustive of all the embodiments, and the obvious variations or variations which may arise from the technical solutions of the present invention still fall within the scope of the present invention.

The invention claimed is:

1. A linear vibration motor, comprising:
   a stator assembly including a housing having a receiving cavity, a magnet located in the receiving cavity and jointly fixed to the housing, and a central magnetic yoke of which at least at one end being jointly fixed to the housing, the magnet including a hollow portion;
   a vibrator assembly including a coil and a mass block, the hollow portion extending along a vibrating direction of the vibrator assembly, the coil vibrating along with the vibrator assembly and inserted into the hollow portion of the magnet when the vibrator assembly vibrates, wherein the central magnetic yoke extends through the coil;
   a resilient support member configured to suspend the vibrator assembly in the receiving cavity of the housing.

2. The linear vibration motor according to claim 1, wherein the inner surface of the housing extends inwardly to integrally form a hollow fixing portion, and one end of the central magnetic yoke is inserted into the hollow fixing portion and closely fits with the hollow portion.

3. The linear vibration motor according to claim 2, wherein the other end of the central magnetic yoke is jointly fixed to the housing.

4. The linear vibration motor according to claim 2, wherein the central magnetic yoke includes a cylindrical body portion, and a cylindrical upper end portion formed by extending upwardly from a center of a top surface of the cylindrical body portion, the diameter of the cylindrical upper end portion being smaller than that of the cylindrical body portion, the cylindrical body portion being inserted into the coil, and a lower end of the cylindrical body portion being inserted into the hollow fixing portion, the cylindrical upper end portion being fixedly connected to an upper surface of the housing.

5. The linear vibration motor according to claim 4, wherein the upper surface of the housing is provided with a fixing hole having a diameter larger than that of the cylindrical upper end portion, and the cylindrical upper end portion is inserted into the fixing hole.

6. The linear vibration motor according to claim 4, wherein the inner surface of a top wall of the housing extends inwardly to integrally form an upper hollow fixing portion, the inner diameter of the upper hollow fixing portion is larger than the diameter of the cylindrical upper end portion, and the cylindrical upper end portion is inserted into the upper hollow fixing portion.

7. The linear vibration motor according to claim 1, wherein the mass block is provided with an avoidance hole for passing through the central magnetic yoke.

8. The linear vibration motor according to claim 1, wherein the vibrator assembly further comprises a magnetic conductive plate, each of the coil and the mass block is fixedly adhered to an upper surface of the magnetic conductive plate, one end of the resilient support member is fixedly adhered to a lower surface of the magnetic conductive plate, and the magnetic conductive plate is provided with a avoiding hole for passing through the central magnetic yoke.

9. The linear vibration motor according to claim 1, wherein the central magnetic yoke is made of a magnetic material.

10. The linear vibration motor according to claim 2, wherein the central magnetic yoke is made of a magnetic material.

11. The linear vibration motor according to claim 3, wherein the central magnetic yoke is made of a magnetic material.

12. The linear vibration motor according to claim 4, wherein the central magnetic yoke is made of a magnetic material.

13. The linear vibration motor according to claim 5, wherein the central magnetic yoke is made of a magnetic material.

14. The linear vibration motor according to claim 6, wherein the central magnetic yoke is made of a magnetic material.

15. The linear vibration motor according to claim 7, wherein the central magnetic yoke is made of a magnetic material.

16. The linear vibration motor according to claim 8, wherein the central magnetic yoke is made of a magnetic material.

* * * * *